S. H. Whorf,
Shoe Sole,

Nº 14,080.      Patented Jan. 8, 1856.

UNITED STATES PATENT OFFICE.

S. H. WHORF, OF ROXBURY, MASSACHUSETTS, ASSIGNOR TO HIMSELF AND CHAS. RICE.

MANUFACTURE OF BOOTS AND SHOES.

Specification of Letters Patent No. 14,080, dated January 8, 1856.

*To all whom it may concern:*

Be it known that I, SYLVANUS H. WHORF, of Roxbury, in the county of Norfolk and State of Massachusetts, have invented a new and useful Improvement in the Manufacture of Shoes by Cementing Together Their Soles and Uppers; and I do hereby declare that the same is fully described and represented in the following specification and the accompanying drawings, letters, figures, and references thereof.

Figure 1:
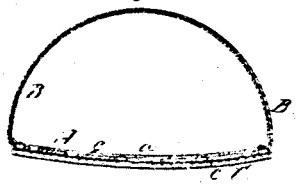
Figure 2:
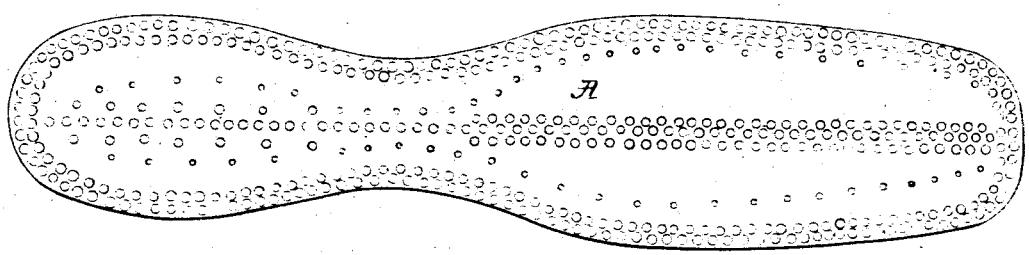
Figure 3:
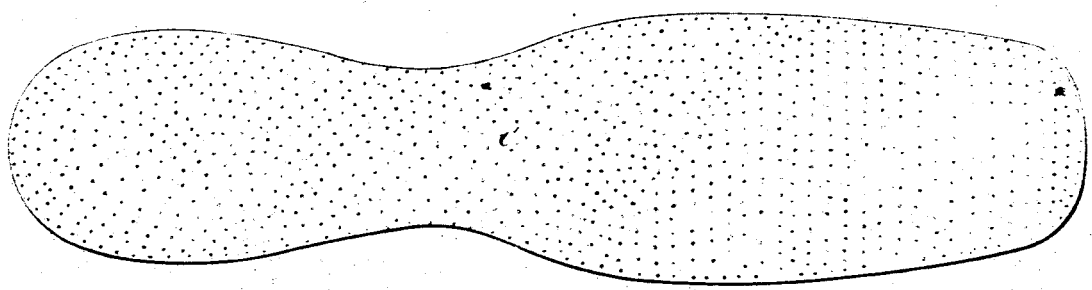

Of such drawings, Figure 1 denotes a transverse section of a shoe manufactured by my improved method. Fig. 2 is a view of its insole or inner sole. Fig. 3 is an inner side view of the outer sole.

In the patent granted on or about the 27th of March, 1855, to H. G. Tyer and John Helm, for an improvement in the manufacture of boots and shoes, the inventors claim uniting the upper sole and upper, manufactured wholly or in part of vulcanized india rubber with the insole of boots or shoes by means of cement, the cement passing through perforations made for that purpose in the upper, in the manner and for the purpose described in the specification.

Being interested in the said patent and invention, and engaged in the manufacture of boots and shoes under the same, I have been led to making my improvement, which consists in perforating the inner and indenting the outer sole as well as perforating the upper in order that not only may the cement extend through the perforations of the upper, but through those of the insole and to the lining and also into the outer sole, the same enabling the soles and upper to be much more thoroughly combined or affixed together than they would be were the cement permitted merely to pass through the upper and attach itself to the plane smooth or unperforated surface.

In carrying out my invention I employ a series of punches each of which is made to extend from a plate, the punches of one being formed so as to wholly perforate and cut pieces out of the leather or sole, while those of the other are made like awls, so as to simply puncture the sole and not pass entirely through it. I perforate the insole and puncture the inner surface of the outer sole as seen in Figs. 2, and 3. Over or upon the inner surface of the insole, I cement a sheet of cloth as seen in Fig. 1, in which $a$, represents the cloth, A the insole, B B, the upper, C the outer sole, and $c, c$, the cement. The cement passing through the inner sole, becomes attached to the lining or cloth, or the cement of its lower surface, the same aiding greatly in firmly fastening the parts together, and as it also passes through the upper and enters the outer sole, the latter becomes fixed by the cement extending from it to the lining, a matter which has not been heretofore attempted in making a shoe. The upper is thus firmly cemented to the lining by the cement extending from it to the latter, such operating greatly to prevent the upper from separating from the soles. If desirable there may be one or more soles perforated like the inner sole and placed between the inner and outer soles and cemented to each and having the cement pass through them, such extra soles being often advantageous in the construction or use of the shoe.

There appears nothing in Tyer and Helm's specification to show that they ever contemplated carrying the perforations beyond the upper. They made them through it alone. Carrying them beyond produces a new or improved result, viz., the union of the insole and upper, as well as the upper and outer sole, by a cement rivet or dowel extended into both, and operating to prevent lateral draft on the upper from tearing it away from the sole to which it may be so attached. To explain this, it should be understood that the adhesive power of two particles of the cement to each other is much greater than the adhesive power of one of them to a particle of leather or cloth. In Tyer and Helm's invention the extension of the cement only through the upper would seem to be really of little advantage in comparison to its extension beyond the same and into perforations made in or through the adjacent soles, because in Tyer and Helm's shoe the ends of the cement, in a perforation of the upper, adhere only to the leather surface or to cement adhering thereto; which may be said to afford no material advantage beyond merely cementing the adjacent surfaces together. But when we have a block or dowel of cement projecting from the upper and into the sole applied to it, we avail ourselves of a greater degree of adhesiveness to sustain the upper to the sol<sup>e</sup> that is to say, we get the whole powe<sup>r</sup> cohesion of the particles of cement to one another as well as the adhesive power of the dowel to the sides of the hole into which it may project. By extending the cement dowel down to the lining of the insole, we carry it through the lining of the upper, which is always placed between the insole and its lining. Thus we attain a firmer hold of the lining of the upper than we should were it simply applied by cement and without holes through it. Another important advantage, over Tyer and Helm's invention, is secured by mine, as by it I am enabled not only to obtain a better coherence of all the parts of the inner and outer soles, but to so connect them that when they are bended together, the elasticity of the connections or rivets, will prevent the soles from loosening the rivets as they are likely to do when in the upper only.

I do not claim uniting the soles to the upper by means of cement made to extend through the upper alone, but What I do claim as my improvement in the manufacture of a shoe by connecting its soles and upper, is—

Extending the cement not only through perforations in the upper but in or through perforations made in or through the insole or the outer sole or both, as specified, the same presenting great advantages not only in securing the parts together but in rendering them water proof when the cement employed is of a character to resist water.

In testimony whereof, I have hereunto set my signature this twenty third day of July A. D. 1855.

SYLVANUS H. WHORF.

Witnesses:
R. H. Eddy,
F. P. Hale, Jr.